April 8, 1952 R. STEVENSON 2,592,353
MULTIPLE CONTROL VALVE
Filed June 21, 1944 2 SHEETS—SHEET 2
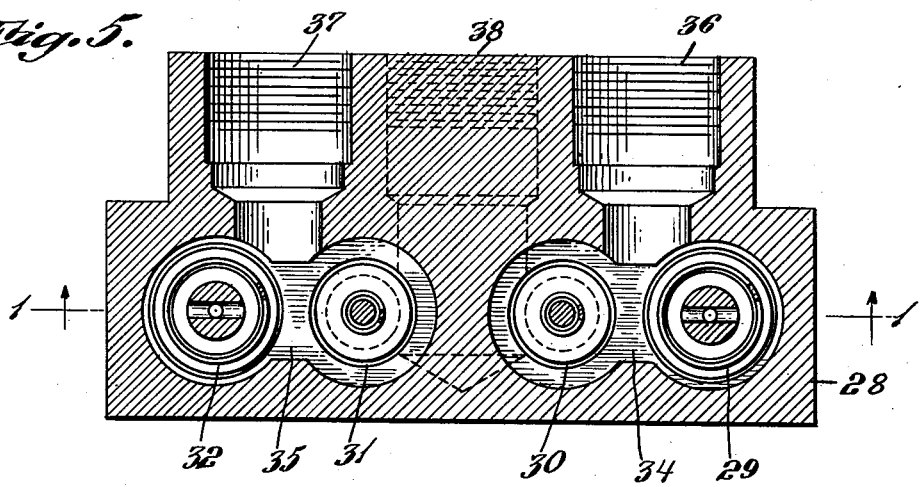
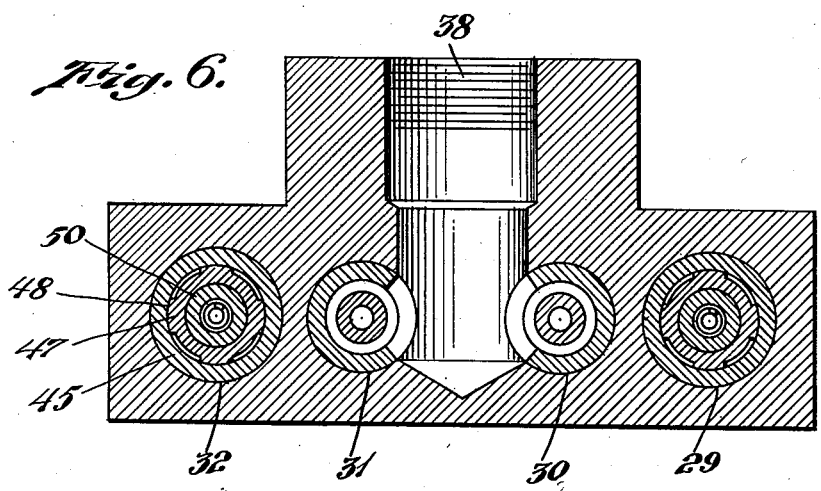
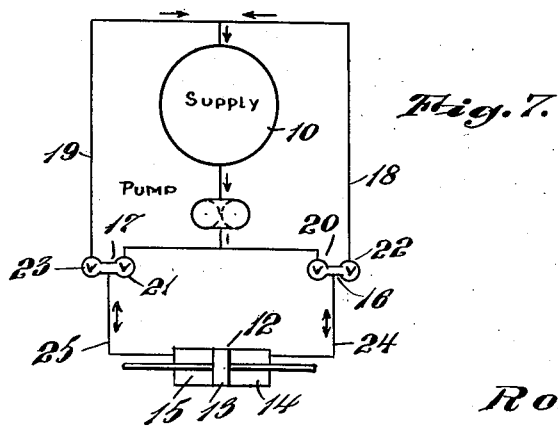
INVENTOR
Robert Stevenson
BY Barlow & Barlow
ATTORNEYS Patented Apr. 8, 1952

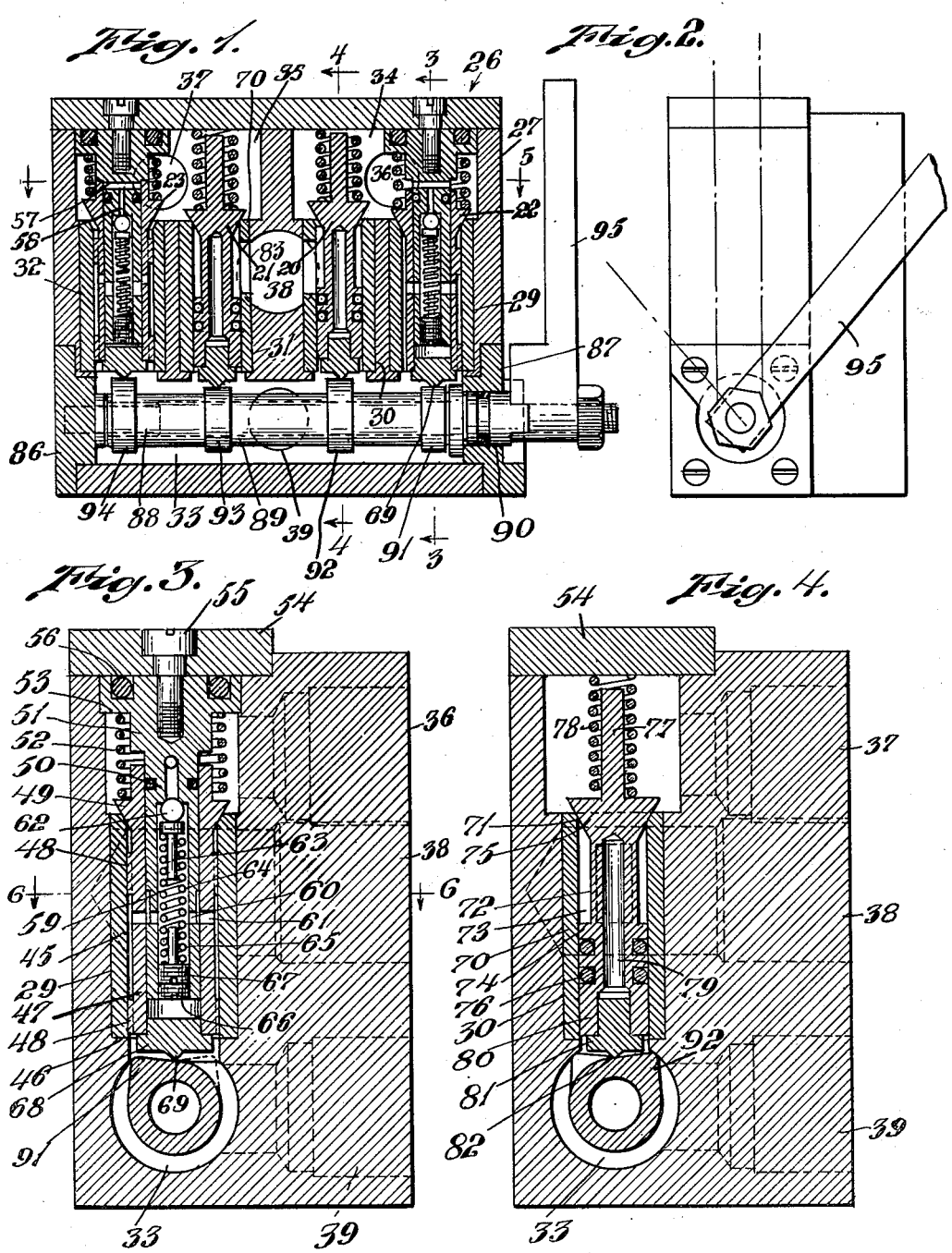

2,592,353

UNITED STATES PATENT OFFICE 2,592,353

MULTIPLE CONTROL VALVE

Robert Stevenson, Barrington, R. I., assignor to Merit Engineering, Inc., a corporation of Rhode Island Application June 21, 1944, Serial No. 541,448

5 Claims. (Cl. 277—20)

1

This invention relates to a device for controlling a fluid conduit of the type which may be used for directing fluid into either of the selected ends of a cylinder for moving the piston in the cylinder in one direction or the other.

Heretofore in the use of a control device of this character a considerable amount of manual pressure or mechanical force had to be used in order to operate the valve, especially if multiple valves were operated at the same time. Further, complicated assemblies were frequently experienced which increased the expense of construction of the device.

One of the objects of this invention is to provide a controlling device for a plurality of valves which will require very little manual or mechanical pressure or effort for moving the parts to operate the valves.

Another object of the invention is to provide an arrangement so that should there be expansion of the liquid due to change in pressures such as may occur quickly in air-borne equipment a relief of pressure in a closed chamber may be had.

A more specific object of the invention is to reduce the area upon which liquid pressure may press so that the effect of the liquid pressure contacting the valve will be at a minimum.

Another object of the invention is to provide a valve for controlling the inlet which will be balanced when in closed position so that there is no pressure pressing in a direction to open the valve or to hold it closed.

Another object of this invention is to so arrange the moving parts that they will be simple to manufacture and assemble.

With these and other objects in view, the invention consists of certain novel features of construction, as will be more fully described and particularly pointed out in the appended claims.

In the accompanying drawings:

Fig. 1 is a sectional view through my improved device on line 1—1 of Fig. 5;

Fig. 2 is an end view thereof;

Fig. 3 is a sectional view on substantially line 3—3 of Fig. 1;

Fig. 4 is a sectional view on substantially line 4—4 of Fig. 1;

Fig. 5 is a sectional view on substantially line 5—5 of Fig. 1;

Fig. 6 is a sectional view on substantially line 6—6 of Fig. 3;

Fig. 7 is a diagrammatic view illustrating schematically the arrangement between the valves of the units herein described and the connection from a fluid reservoir to a pump through the

2 control unit to a cylinder having a piston therein and return to the fluid reservoir.

The general plan of the operation of this invention is best explained with reference to Fig. 7 wherein 10 designates a fluid reservoir and 11 a gear pump for drawing fluid from the reservoir to supply it to a cylinder 12 having a piston 13 therein. The fluid may be directed to the end 14 of the cylinder to move the piston to the left or directed to the end 15 of the cylinder to force the piston 13 to the right. In the event that fluid is forced in at 14 to move the piston to the left the valves are so arranged that fluid will be permitted to flow from the end 15 back to the supply reservoir. This result is accomplished by provision of chambers 16 and 17 to which fluid from the pump may be supplied, while from these chambers return conduits 18 and 19 extend back to the reservoir. The supply to the chambers 16 and 17 is controlled by valves 20 and 21 while the return from the chambers is controlled by the valves 22 and 23. The conduits 24 and 25 are always open from the chambers 16 and 17 to the cylinder ends 14 and 15. The valves 20 and 21 are arranged to operate oppositely, when one opens the other closes. Likewise the valves 22 and 23 are arranged to operate oppositely so that when one opens the other closes. Each pair of valves 20, 22 and 21, 23 operate oppositely so that when one opens the other closes. All four of the valves operate simultaneously from the same control means. By this arrangement when the valve 20 opens liquid enters the chamber 16, thence through conduit 24 to the cylinder 12 at the end 14 to move the piston to the left. At the same time liquid on the opposite side of the piston is forced outwardly from the cylinder at the end 15 through the conduit 25 while the valve 23 opens so that the liquid may be forced back to the supply tank or reservoir. If it is desired to move the piston in the opposite direction the valve 20 is closed and 22 opened while valve 21 is opened and 23 is closed. In this case fluid will be forced from the chamber 17 through the conduit 25 to the end 15 of the cylinder to move the piston to the right which will force liquid out of the end 14 through the conduit 24 through the chamber 16 and thence through the open valve 22 back to the reservoir.

The device for housing these various valves comprises a body designated generally 26 (Fig. 1), which is formed from a block 27 having a plurality of cylindrical bores therein designated 29, 30, 31, 32 (see Fig. 5). The axes of these bores are parallel and all are in the same plane. At the lower end of the block these bores all connect with a common bore 33 as shown in Figs. 1 and 3. A conduit 36 provides a lead out port from the chamber 34 connecting bores 29 and 30 which would be equivalent to chamber 16 while a conduit 37 provides a lead out port from the chamber 35 connecting bores 31 and 32 which would be equivalent to chamber 17. An intake port 38 extends inwardly from the body and intersects the bores 30 and 31 so as to communicate therewith. A conduit 39 (see Figs. 3 and 4) extends inwardly from the same face of the body of the block so as to connect with the bore 33.

The assemblies in the bores 29 and 32 are identical and each comprises a bushing 45 which rests upon a shoulder 46 at the lower end of the bore. Within this sleeve there is a valve or plunger 47 which would correspond to the valves 22 or 23 and which is provided with radial fins 48, four in number, (see Fig. 6), at a point adjacent its lower end and also at a point spaced therefrom for slidingly engaging the upper portion of the bore or sleeve 45. At a point adjacent the upper end of the sleeve 45 this plunger is enlarged to provide a head 49 which engages the edge of the upper end of the sleeve so as to provide a tight joint therewith, the contacting surfaces being ground for this purpose. Within the tubular plunger there projects a stem 50 which is of a size to slidingly fit the inner bore of the plunger and guide the same in its movement. This stem 50 is enlarged as at 51 for guiding the spring 52 which acts between the shoulder 53 on the stem and the head 49 of the plunger to force the plunger downwardly in the bore of the bushing. This stem is suspended in position from a cover 54 which forms a part of a casing or body by means of a bolt 55 which which passes through this cover 54 and into the stem 50. A soft packing 56 serves to seal the stem to the cover.

The upper end of this plunger is, of course, located in the chamber 34 and when the head 49 is raised from its seat a passage exists from this chamber 34 between the plunger and the bushings to connect with the chamber or passage 33.

The stem 50 is provided with a lateral conduit 57, Fig. 1, in which there extends axially of the stem a bore 58 connecting with a larger bore 59 while a lateral bore 60 in the stem may also register with a lateral bore 61 in the plunger when seated so that communication is established by a conduit from the chamber 34 through the stem to the space between the plunger and the bushing and thence to the bore 33. This communication is controlled by a ball valve 62 which is forced to a seat on the shoulders between the bores 58 and 59 by a plunger 63 forced by means of a spring 64 to effect this action. The opposite end of the spring has an abutment which may be threaded into the lower end 66 of the bore 65 of the stem, such abutment being designated 67. In this manner should the pressure in the chamber 34 become too great the relief valve 62 which is set to open at a point higher than normal operating conditions of the device would open to permit leading from this cylinder of such fluid as would be necessary to reduce the pressure to a compatible amount.

The lower end of the plunger is closed by a plug 68 having a knob 69 to be engaged by a cam for actuating the plunger.

By providing a stem entering the central part of the plunger a very narrow edge or annular surface is presented between the minimum outer diameter of the plunger and the minimum inner diameter thereof which will materially reduce pressure which may be exerted upon the plunger.

The bores 30 and 31 are occupied by identical assemblies, shown more particularly in Fig. 4. In each bore 30 and 31 there is provided a sleeve or bushing 70, the upper edge of which 71 provides a valve seat. Within this bushing there is located a plunger 72 which is equivalent to the valves 20, or 21 which is reduced intermediate its ends as at 73 to provide a shoulder 74 at one end of the reduced portion while the other end is fashioned into a head 75, tapered to engage the seat 71. A packing 76 is provided between the lower portion of the plunger and the bushing 70 so as to prevent the escape or passage of liquid between adjacent surfaces of the said lower portion and bushing 70. The extreme upper end of the plunger is reduced in diameter to provide a guide portion 77 for a spring 78 which acts against the cover 54 and against the head 75 to move the plunger downwardly within the bushings 70. The plunger is bored out axially as at 79 and 80 and is provided with a plug 81, having a projection 82 thereon to be engaged by a cam for operating the same.

The intake 38 communicates with the reduced portion of this plunger by an opening 83 in the bushing 70 while the valve seat 71 when closed prevents the intake from supplying the chamber 34 or 35 as the case may be.

The ends of the bore 33 are closed by covers 86 and 87 which provides bearings for the stub shaft 88 on which the shaft 89 is rotatably mounted at one end, while it is rotatably mounted in the bearing 90 in the closure 87 at the other end. Upon this shaft there is provided cams 91, 92, 93, and 94 to engage the projections 69 and 82 of the plugs at the lower end of each of the valves. These cams are so arranged that when the shaft is rotated by means of handle 95 the valve in bores 30 and 32 will be raised together while the valves in the bores 29 and 31 will be lowered together and vice versa. In this way as the chamber 34 is opened to supply the cylinder on one side, the valve in the bore 31 is closed while the valve to the exhaust port and bore 33 in the bore 32 is opened, thus permitting fluid which is forced from the cylinder by movement of the piston in one direction to be returned to the supply through the exhaust from the cylinder 35.

I claim:

1. In a valve, a body having a pair of spaced chambers, an inlet port, separate conduits opening in each of said chambers for connecting said inlet port to each of said chambers, a valve for controlling each conduit, an exhaust port, a second set of separate conduits opening in each of said chambers for connecting said exhaust port to each of said chambers, a second valve having a reduced annular area exposed to the liquid pressure in said chambers for controlling each of said second set of conduits and having a passage therethrough providing a conduit from said chamber to said exhaust port when said second valve is in the closed position, resilient means for each valve urging said valve to closed position, and manual means to effect opening of the inlet port to one chamber and closure of the exhaust port therefrom and simultaneously effecting an opposite movement of the inlet and exhaust valves of the conduits of the other chamber and valve means for controlling said passages operable by an excess pressure of the liquid in said chambers when said second valve is in the closed position.

2. In a valve, a body having a pair of spaced chambers, an inlet port, separate conduits connecting said inlet port to each of said chambers, a valve for controlling each conduit, an exhaust port, a second set of separate conduits connecting said exhaust port to each of said chambers, a second valve having a reduced annular area exposed to the liquid pressure in said chambers for controlling each of said second set of conduits and having a passage therethrough providing a conduit from said chamber to said exhaust port when said second valve is in the closed position, resilient means for each valve urging said valve to closed position, and cam means to effect opening of the inlet port to one chamber and closure of the exhaust port therefrom and simultaneously effecting an opposite movement of the inlet and exhaust valves of the conduits of the other chamber and valve means for controlling said passages operable by an excess pressure of the liquid in said chambers when said second valve is in the closed position.

3. In a valve, a body having a pair of spaced chambers, an inlet port, separate conduits connecting said inlet port to each of said chambers, a valve for controlling each conduit, an exhaust port, a second set of separate conduits connecting said exhaust port to each of said chambers, a second valve having a reduced annular area exposed to the liquid pressure in said chambers for controlling each of said second set of conduits and having a passage therethrough providing a conduit from said chamber to said exhaust port when said second valve is in the closed position, resilient means for ecah valve urging said valve to closed position, a shaft extending beneath all of said valves, cams on said shaft one located beneath each valve for simultaneously controlling said valves and valve means for controlling said passages operable by an excess pressure of the liquid in said chambers when said second valve is in the closed position.

4. In a valve, a body having a pair of spaced chambers, an inlet port, separate conduits connecting said inlet port to each of said chambers, a valve having liquid pressure equalizing means for controlling each conduit, an exhaust port, a second set of separate conduits connecting said exhaust port to each of said chambers, a second valve having a reduced annular area exposed to the liquid pressure in said chambers for controlling each of said second set of conduits and having a passage therethrough providing a conduit from said chamber to said exhaust port when said second valve is in the closed position, resilient means for each valve urging said valve to closed position, and manual means to effect opening of the inlet port to one chamber and closure of the exhaust port therefrom and simultaneously effecting an opposite movement of the inlet and exhaust valves of the conduits of the other chamber and valve means for controlling said passages operable by an excess pressure of the liquid in said chambers when said second valve is in the closed position.

5. In a valve a body having a pair of spaced chambers, an inlet port, separate conduits connecting said inlet port to each of said chambers, a valve having liquid pressure equalizing means for controlling each conduit, an exhaust port, a second set of separate conduits connecting said exhaust port to each of said chambers, a second valve having a reduced annular area exposed to the liquid pressure in said chambers for controlling each of said second set of conduits and having a passage therethrough providing a conduit from said chamber to said exhaust port when said second valve is in the closed position, resilient means for each valve urging said valve to closed position, a shaft extending beneath all of said valves, cams on said shaft one located beneath each valve for simultaneously controlling said valves and valve means for controlling said passages operable by an excess pressure of the liquid in said chambers when said second valve is in the closed position.

ROBERT STEVENSON.

REFERENCES CITED

The following references are of record in the file of this patent:

UNITED STATES PATENTS

| Number | Name | Date |
|---|---|---|
| 1,583,834 | Humphrey | May 11, 1926 |
| 1,775,856 | Hauser | Sept. 16, 1930 |
| 2,275,963 | Herman | Mar. 10, 1942 |
| 2,294,702 | Van Der Werff | Sept. 1, 1942 |
| 2,338,101 | Ellinwood | Jan. 4, 1944 |
| 2,362,945 | Stephens | Nov. 14, 1944 |
| 2,363,481 | Campbell | Nov. 28, 1944 |
| 2,436,425 | Fioretta | Feb. 24, 1948 |